(12) United States Patent
Katoh (10) Patent No.: US 6,266,088 B1
(45) Date of Patent: Jul. 24, 2001

(54) METHOD OF EDGE CRISPENING IN COLOR IMAGE SENSOR AND CIRCUIT FOR CARRYING OUT THE SAME

(75) Inventor: Satoshi Katoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/893,779

(22) Filed: Jul. 11, 1997

(30) Foreign Application Priority Data

Jul. 15, 1996  (JP) .................................................. 8-184374

(51) Int. Cl.[7] .................................................. H04N 9/64
(52) U.S. Cl. .................................................. 348/253
(58) Field of Search .................................. 348/253, 625, 348/630, 631, 627, 606; 358/447, 520; 382/167, 269, 266, 274

(56) References Cited

U.S. PATENT DOCUMENTS

| 4,183,051 | * | 1/1980 | Richman | 348/631 |
| 5,077,603 | * | 12/1991 | Macovski | 358/37 |
| 5,200,824 | * | 4/1993 | Kageyama | 358/167 |
| 5,298,981 | | 3/1994 | Topper et al. | 348/630 |
| 5,515,112 | * | 5/1996 | Penney | 348/630 |

FOREIGN PATENT DOCUMENTS

| 55-10288 | 1/1980 | (JP) | H04N/9/36 |
| 57-127375 | 8/1982 | (JP) | H04N/9/535 |
| 62-154892 | 7/1987 | (JP) | . |
| 63-90283 | 4/1988 | (JP) | H04N/9/68 |
| 1-259464 | 10/1989 | (JP) | . |
| 2-285778 | 11/1990 | (JP) | H04N/5/208 |
| 6-197364 | 7/1994 | (JP) | H04N/9/68 |
| 7-298283 | 11/1995 | (JP) | . |

* cited by examiner

Primary Examiner—Wendy R. Garber
Assistant Examiner—Aung S. Moe
(74) Attorney, Agent, or Firm—Foley & Lardner (57) ABSTRACT

A method and a circuit for producing good edge crispening effect by an out-of-green method is not affected by the colors of the subject imaged by a color image sensor. The edge crispening circuit includes first and second arithmetic units, a comparator, and a decision circuit. The first arithmetic unit calculates the ratio of the magnitude of an input blue (B) signal to the magnitude of an input green (G) signal. The second arithmetic unit calculates the ratio of the magnitude of an input red (R) signal to the magnitude of the green (G) signal. The comparator compares these two ratios and selects a larger one. The decision means compares the coefficient selected by the comparator means with a reference value α and produces a coefficient k. The magnitudes of the edge crispening signal to be added to the R, G, B signals, respectively, are determined from the coefficient k. Finally, weighted edge crispening signals are added to the R, G, B signals, respectively.

9 Claims, 6 Drawing Sheets

METHOD OF EDGE CRISPENING IN COLOR IMAGE SENSOR AND CIRCUIT FOR CARRYING OUT THE SAME

BACKGROUND OF THE INVENTION

The present invention relates to an edge crispening circuit and, more particularly, to a method of performing edge crispening by an out-of-green system in a color image sensor and a circuit for carrying out the same.

Heretofore, color cameras equipped with edge crispening devices have been proposed. Where an image signal from a color camera is processed by an edge crispening method in the prior art edge crispening circuitry, edge crispening circuits are provided for green (G), blue (B), and red (R) signals, respectively. These edge crispening circuits create edge crispening signals for the edges or contours of an image. These edge crispening signals are superimposed on the R,. G,and B signals, thus obtaining an edge-enhanced color image.

This conventional method needs three edge crispening circuits. Hence, large-sized circuitry is necessary. Also, the cost is increased. Therefore, this method has been mainly used for high-grade cameras such as those used in broadcasting stations.

In recent years, domestic video movies have become widespread. Therefore, there is a need for more compact low-cost color cameras. Also, an edge crispening circuit of a smaller size has been required.

An out-of-green edge crispening circuit is available as a means for accomplishing an edge crispening circuit of a smaller size, and is described in the "Prior Art Technique" column of Japanese Patent Laid-Open No. 285778/1990. In this prior art out-of-green edge crispening device, an edge crispening signal is created from the image signal from the green color image sensor device and superimposed on blue and red signals. In this way, edge crispening is performed for each color signal.

However, the prior art edge crispening device utilizing the out-of-green method has the following problems. Since the edge crispening signal is created from the green signal, the level of the edge crispening signal relative to all the R, G, and B signals is determined by the ratio of the green signal component contained in the imaged subject. Therefore, the edge crispening effect is affected greatly by the color of the subject.

For example, where the subject is a totally blue pattern, the G signal level is low and so the level of the edge crispening signal DTL1 is low. As a result, sufficient edge crispening effect cannot be obtained.

SUMMARY OF THE INVENTION

It is an object of the present invention to provide an edge crispening method capable of producing a good edge crispening effect irrespective of the colors of the subject.

It is another object of the invention to provide an edge crispening circuit capable of producing good edge crispening effect irrespective of the colors of the subject.

In accordance with one aspect of the present invention, there is provided an edge crispening method in which an edge crispening signal is created from the green (G) signal. This edge crispening signal is superimposed on the three primary color signals, i.e., green (G), blue (B), and red (R), to crispen the edges of a reproduced image. This method is characterized in that the magnitude of the edge crispening signal superimposed on the R, G, and B signals is controlled according to the ratios of the levels of the B and R signals to the level of the G signal.

In accordance with another aspect of the present invention, there is provided an edge crispening method in which an edge crispening signal is created from the green (G) signal. This edge crispening signal is superimposed on the three primary color signals, i.e., green (G), blue (B), and red (R), to crispen the edges of a reproduced image. This method is characterized in that coefficients, or weighting factors, are calculated from the ratios of the levels of the B and R signals to the level of the G signal and that the edge crispening signal is multiplied by the coefficients. The resultant signals, hereinafter referred to as the weighted edge crispening signals, are superimposed on the R, G, and B signals. Preferably, the levels of the R, G, and B signals are found from their respective amplitudes.

In accordance with the present invention, there is provided an edge crispening circuit which comprises arithmetic means, a decision means, and superimposing means. The arithmetic means calculate the ratio of the level of the blue (B) signal to the input green (G) signal, as well as the ratio of the level of the red (R) signal to the level of the green (G) signal. The decision means produces coefficients, or weighting factors, used to control the magnitudes of the edge crispening signal superimposed on the R, G, and B signals. The coefficients are found from the ratios described above. The superimposing means superimpose the weighted edge crispening signals to the R, G, and B signals.

Preferably, the edge crispening circuit in accordance with the present invention further includes comparator means and a level-varying means. The aforementioned arithmetic means comprise first and second arithmetic means. The first arithmetic means produces a coefficient k1 from the levels of the G and B signals. The second arithmetic means produces a coefficient k2 from the levels of the G and R signals. The comparator means compares the magnitudes of the coefficients k1 and k2 and selects a larger one. The decision means compares the coefficient k1 or k2 selected by the comparator means with a reference value α and produces a coefficient k. The level-varying means preferably varies the level of the edge crispening signal according to the coefficient k produced by the decision means.

Other objects and features of the invention will appear in the course of the description thereof, which follows.

DESCRIPTION OF THE PREFERRED EMBODIMENT

Before describing the preferred embodiments of the present invention, the prior art technique is described in order to facilitate understanding the present invention.

Figure 1:
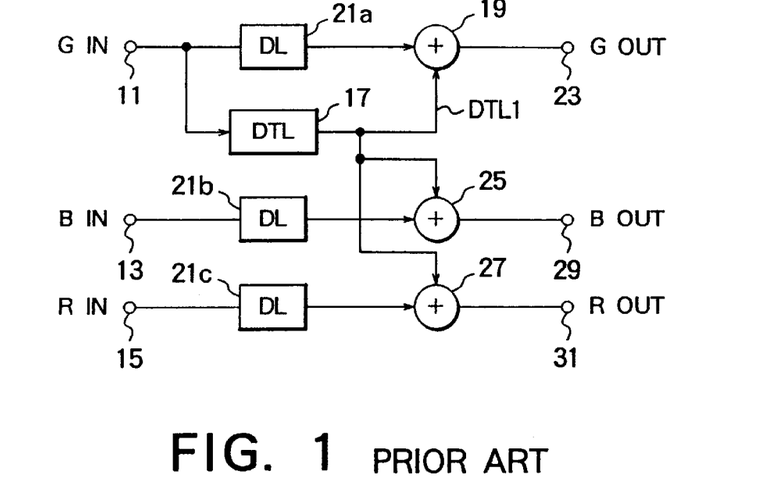
FIG. 1 is a block diagram of an edge crispening circuit relying on the prior art techniques.

Referring to FIG. 1, there is shown an out-of-green edge crispening circuit described in the above-cited Japanese Patent Laid-Open No. 285778/1990. This circuit has an input terminal 11 to which a video signal G-IN produced by an image sensor device (not shown) in response to green (G) color is supplied. The edge crispening circuit further includes input terminals 13 and 15 to which a blue signal B-IN and a red signal R-IN are respectively supplied. The edge crispening circuit is further equipped with an edge crispening signal-generating circuit (DTL) 17 to which the green signal G-IN is fed to produce a vertical/horizontal edge crispening signal DTL1. A delay circuit or delay line (DL) 21a is placed before a first adder circuit 19 so that the green input signal G-IN and the edge crispening signal DTL1 are applied to the first adder circuit 19 with equal delay. This first adder circuit 19 produces the sum of these two input signals G-IN and DTL1. The output signal from the first adder circuit 19 is produced as a green output signal G-OUT from an output terminal 23.

Similarly, another delay circuit or delay line 21b is positioned before a second adder circuit 25, which produces the sum of the blue input signal B-IN and the edge crispening signal DTL1. A further delay circuit or delay line 21c is located before a third adder circuit 27, which produces the sum of the red input signal R-IN and the edge crispening signal DTL1. The output signals from the adder circuits 25 and 27 are produced as blue output signal B-OUT and red output signal R-OUT, respectively, from output terminals 29 and 31, respectively.

The edge crispening circuit designed as shown in FIG. 1 operates in the manner described now. The green signal G-IN applied to the input terminal 11 is supplied to the first delay line 21 and to the crispening signal-generating circuit 17. This crispening signal-generating circuit 17 creates the vertical/horizontal edge crispening signal DTL1 from the input green signal G-IN.

The operation of the crispening signal-generating circuit 17 is next described in further detail with reference to FIGS. 2 and 3. FIG. 3 shows the waveforms of signals G0–G6, VDTL, and HDTL at various portions of the circuit shown in FIG. 2. It is assumed in FIG. 3 that the input signal is at level 1.

Figure 2:
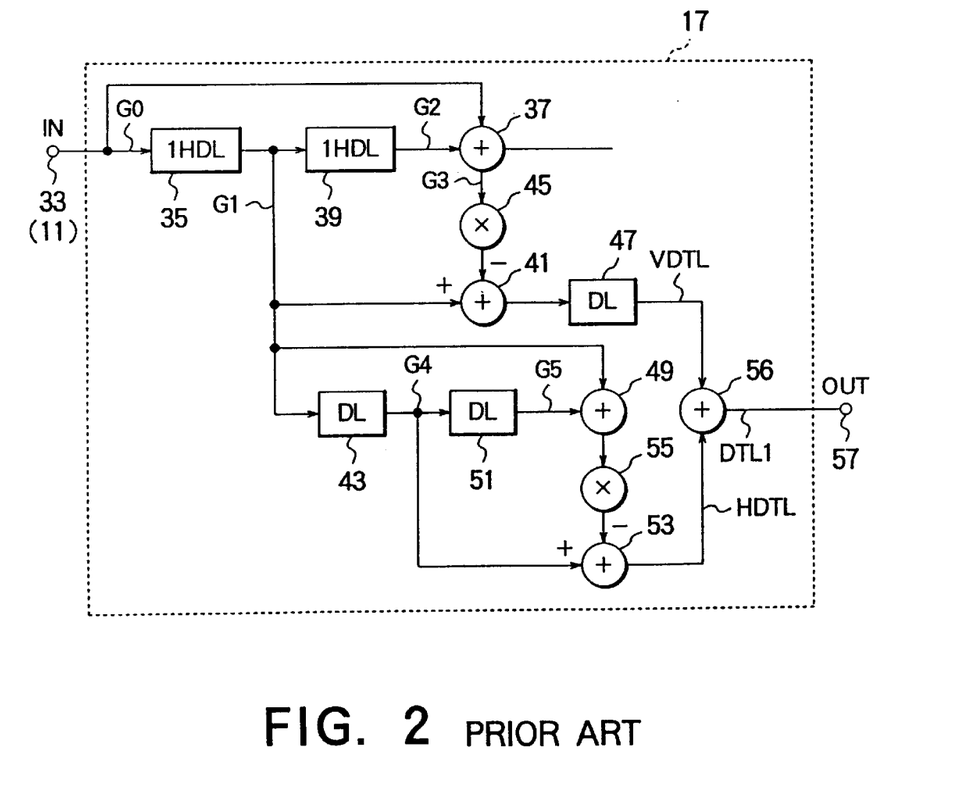
FIG. 2 is a circuit diagram of an edge crispening signal-generating circuit shown in FIG. 1.
Figure 3:
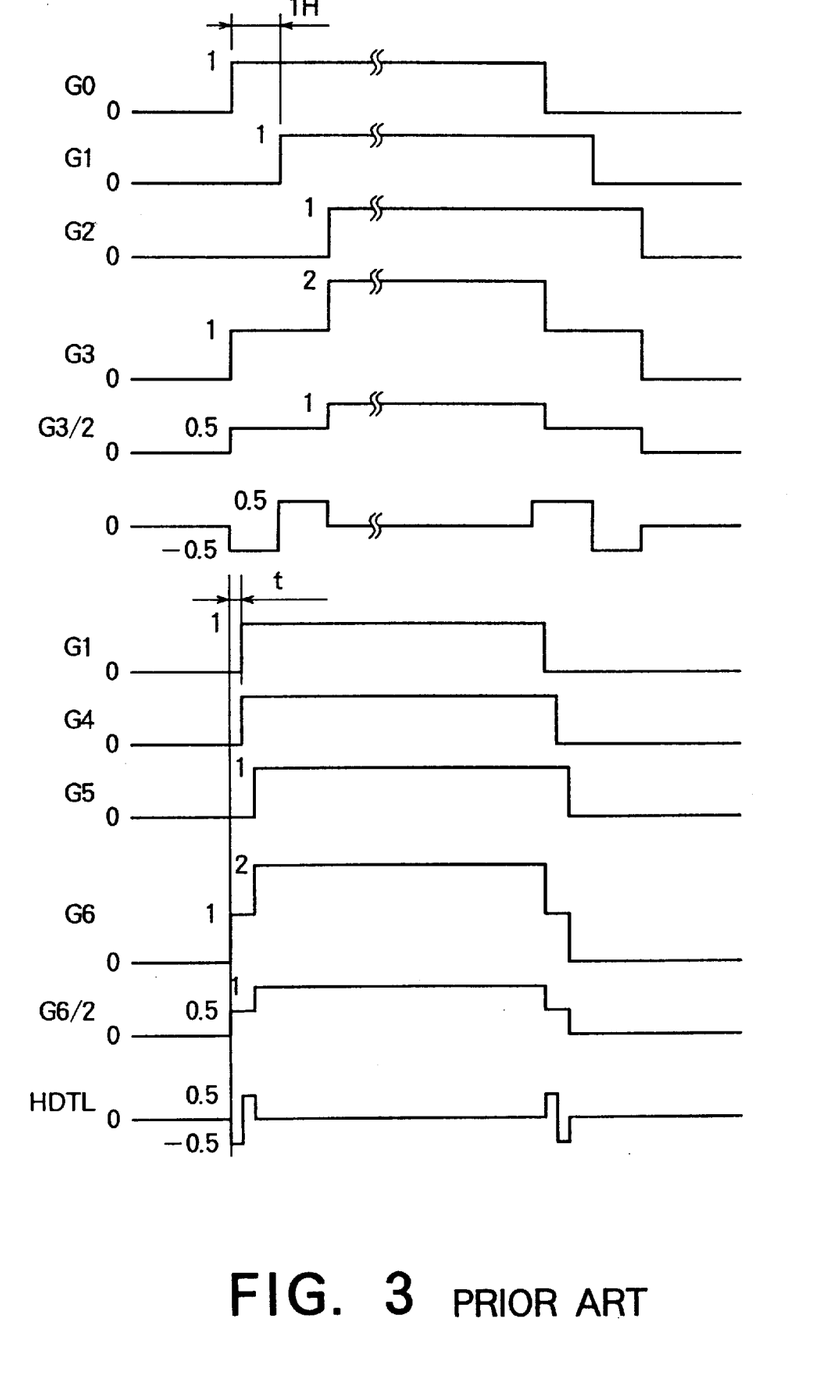
FIG. 3 is a waveform diagram illustrating the operation of the edge crispening signal-generating circuit shown in FIG. 2.

Referring next to FIG. 2, the signal G0 applied from an input terminal 33 is supplied to a first delay line 35 and to an adder circuit 37. The first delay line 35 delays its input signal by one horizontal period 1H. The output signal from the first delay line 35 is furnished to a following second delay line 39 and to an adder circuit 41, as well as to a delay line (DL) 43. The second delay line 39 delays its input signal by one horizontal period 1H. The adder circuit 37 receives the signal G0 and the output signal G2 from the second delay line 39, the signal G2 being delayed by 2H. The adder circuit 37 produces the sum G3 of these signals to a multiplier 45, which multiplies the sum signal G3 by a given coefficient, or weighting factor. The adder circuit 41 produces the difference between the output signal G1 and the output signal from the multiplier 45, the signal G1 being delayed by 1H by the first delay line 35. As a result, a vertical edge crispening signal VDTL is produced to a delay line 47 so that the vertical edge crispening signal VDTL and a horizontal edge crispening signal HDTL (described later) are delayed by the same amount. As shown in FIG. 3, the vertical edge crispening signal VDTL takes a quadratic differential waveform having a width of 2H and has a vertical burst frequency of ½H.

The aforementioned signal G1 is applied to the delay line (DL) 43 and to an adder circuit 49. The delay line 43 is set at a given delay time, say t sec, according to frequency components used for edge crispening. The output signal G4 from the delay line 43 is supplied to a delay line 51 and to an adder circuit 53. The delay line 51 is set at a delay time of t sec, in the same way as the delay line 43. The adder circuit 49 produces the sum G6 of the signal G1 and an output signal G5 from the delay line 51. The sum signal G6 is multiplied by a given coefficient or weighting factor by a multiplier 55. The adder circuit 53 located after the multiplier 55 produces the difference between the signal G4 and the signal G6 from the adder circuit 49, thus creating the horizontal edge crispening signal HDTL. As shown in FIG. 3, this horizontal edge crispening signal HDTL takes a quadratic differential waveform having a duration of 2t and has a horizontal burst frequency of ½t. Finally, the vertical edge crispening signal VDTL and the horizontal edge crispening signal HDTL are combined by an adder circuit 56 into a horizontal/vertical edge crispening signal DTL1, which is produced from an output terminal 57.

The edge crispening signal DTL1 created as described above is added to the green input signal G-IN by the first adder circuit 19, the green input signal G-IN being made to have the same delay time as the edge crispening signal DTL1 by the delay line 21a. Similarly, the second adder circuit 25 produces the sum of the blue input signal B-IN and the edge crispening signal DTL1. The third adder circuit 27 produces the sum of the red input signal R-IN and the edge crispening signal DTL1. The edge-enhanced image signals R, G, B are produced as G-OUT, B-OUT, and R-OUT, respectively, from the output terminals 23, 29, and 31, respectively.

The preferred embodiments of the invention are next described. It is to be noted that like components are indicated by like reference numerals in various figures.

FIRST EXAMPLE

Figure 4:
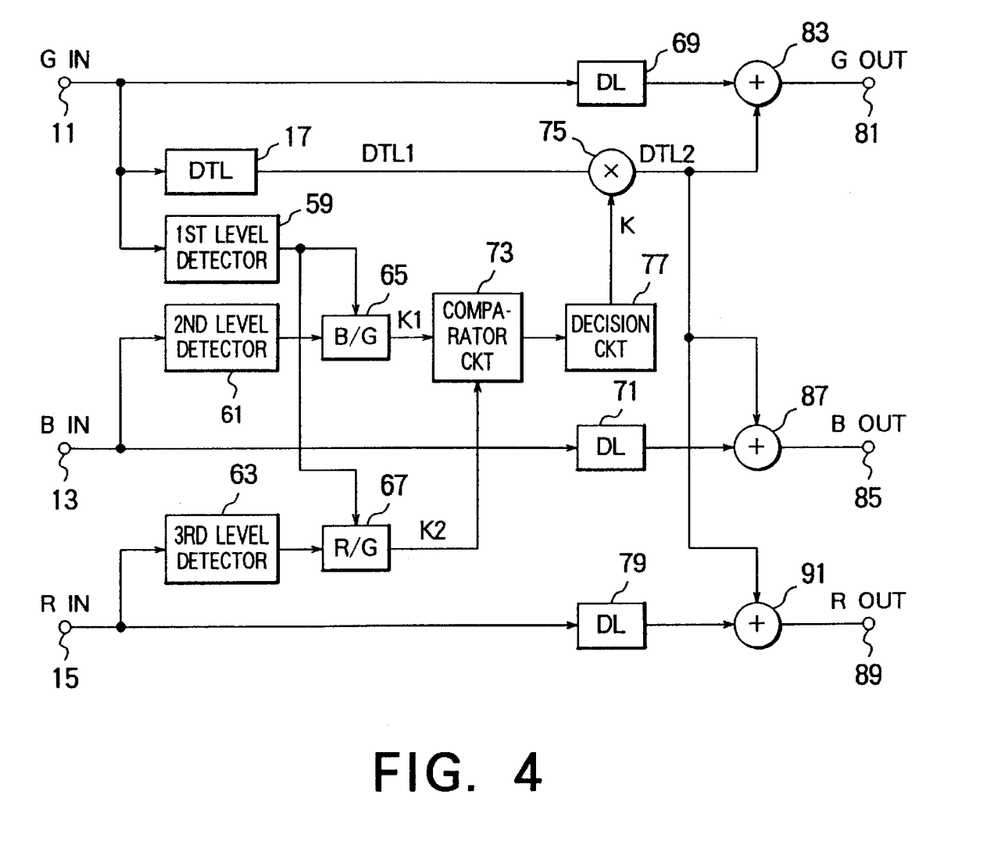
FIG. 4 is a block diagram of one example of edge crispening circuit in accordance with the invention.

Referring to FIG. 4, an edge crispening circuit in accordance with a first example of the invention comprises a crispening signal-generating circuit (DTL) 17 connected with an input terminal 11, a first level detector 59 connected with the input terminal 11 and forming a first level-detecting means, a second level detector 61 connected with an input terminal 13 and forming a second level-detecting means, a third level detector 63 connected with an input terminal 15 and forming a third level-detecting means, a first arithmetic circuit (B/G) 65 connected with the outputs of the first level detector 59 and of the second level detector 61 and forming a first arithmetic means, a second arithmetic circuit (R/G) 67 connected with the outputs of the first level detector 59 and of the third level detector 63 and forming a second arithmetic means, a first delay line (DL) 69 connected with the input terminal 11, a second delay line (DL) 71 connected with the input terminal 13, a comparator circuit 73 connected with the first arithmetic circuit (B/G) 65 and with the second arithmetic circuit (R/G) 67 and forming a comparator means, a multiplier 75 connected with the output of a crispening signal-generating circuit 17, a decision circuit 77 connected with the output of the comparator circuit 73 and with the input of the multiplier 75 and forming a decision means, a third delay line (DL) 79 connected with the input terminal 15, a first adder circuit 83 connected with the outputs of the first delay line (DL) 69 and of the multiplier 75 and with the input of a terminal 81 and forming a first adder means, a second adder circuit 87 connected with the outputs of the first delay line (DL) 71 and of the multiplier 75 and with the input of the terminal 85 and forming a second adder means, and a third adder circuit 91 connected with the outputs of the multiplier 75 and of the third delay line (DL) 79 and with the output of a terminal 89. The multiplier 75 is a level-varying means.

The green input signal G-IN entered from the input terminal 11 is supplied to all of the crispening signal-generating circuit 17, the first level detector 59, and the first delay line (DL) 69. The crispening signal-generating circuit 17 produces the horizontal/vertical edge crispening signal DTL1 for the green input signal G-IN. The first level detector 59 detects the level of the entered green input signal G-IN and supplies a corresponding signal to the following first arithmetic circuit (B/G) 65.

The blue input signal B-IN entered from the input terminal 13 is supplied to the second level detector 61 and to the second delay line (DL) 71. The second level detector 61 detects the level of the entered blue input signal B-IN and supplies a corresponding signal to the following first arithmetic circuit (B/G) 65.

Similarly, the red input signal R-IN entered from the input terminal 15 is fed to the third level detector 63 and to the third delay line (DL) 79. The third level detector 63 detects the level of the entered red input signal R-IN and supplies a corresponding signal to the second arithmetic circuit (R/G) 67.

The first arithmetic circuit (B/G) 65 calculates a coefficient k1 from the level of the green input signal G-IN and from the level of the blue input signal B-IN. These levels are detected by the first level detector 59 and the second level detector 61, respectively. This coefficient k1 is supplied to the comparator circuit 73.

Similarly, the second arithmetic circuit (R/G) 67 computes a coefficient k2 from the level of the green input signal G-IN detected by the first level detector 59 and from the level of the red input signal R-IN detected by the third level detector 63. This coefficient k2 is also supplied to the comparator circuit 73.

The comparator circuit 73 compares the coefficients k1 and k2 and supplies a greater one to the succeeding decision circuit 77. This decision circuit 77 compares the coefficient k1 or k2 from the comparator circuit 73 with a reference value α in terms of level. Finally, a coefficient k is supplied to the following multiplier 75.

The edge crispening signal DTL1 produced by the crispening signal-generating circuit 17 is given to the multiplier 75, which in turn multiplies the edge crispening signal DTL1 by the coefficient k to produce a second edge crispening signal DTL2 to the succeeding three adder circuits 83, 87, and 91. The first adder circuit 83 adds the second edge crispening signal DTL2 to the green input signal G-IN whose delay time is made coincident with that of the crispening signal DTL2 by the delay line 69. An output signal G-OUT undergone the edge crispening processing is produced from the output terminal 81.

Similarly, the second adder circuit 87 adds the blue input signal B-IN to the second edge crispening signal DTL2, the blue input signal B-IN being made coincident in delay time with the second edge crispening signal DTL2 by the delay line 71. An edge-enhanced output signal B-OUT is produced from an output terminal 85.

The third adder circuit 91 adds the red input signal R-IN to the second edge crispening signal DTL2, the red input signal R-IN being made coincident in delay time with the signal DTL2 by the delay line 79. An edge-enhanced output signal R-OUT is produced from the output terminal 89.

Since the crispening signal-generating circuit 17 is similar to the crispening signal-generating circuit shown in FIG. 2, the details of this circuit 17 are not described herein.

The structure of the three level detectors 59, 61, and 63 is next described in detail. These level detectors can be readily implemented, using a sample-and-hold circuit, for example.

Figure 5:
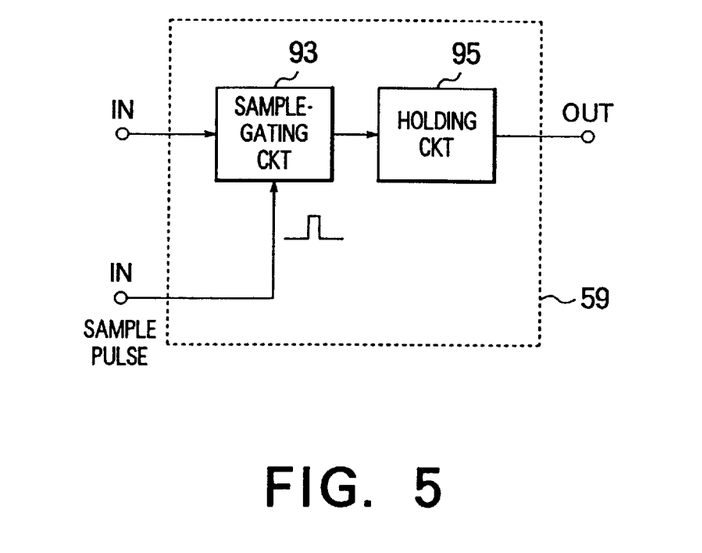
FIG. 5 is a block diagram of a level detector used in the present invention.

FIG. 5 is a block diagram showing the structure of each of the first, second, and third level detectors 59, 61, and 63, respectively. Since these three level detectors 59, 61, and 63 are identical in structure, only the level detector 59 will be described by way of example. In FIG. 5, the first level detector 59 comprises a sample-gating circuit 93 and a holding circuit 95. When a sample pulse is applied, the sample-gating circuit 93 is gated on. The resultant signal level is held by the holding circuit 95 and produced from an output terminal OUT.

The details of the structure of the first and second arithmetic circuits 65 and 67, respectively, shown in FIG. 4 are now described. These level decision circuits can be accomplished, using a division circuit, for example. Also, the comparator 73 and the decision circuit 77 can be built, using a comparator circuit.

The operation of the edge crispening circuit shown in FIG. 4 is next described in detail. The green input signal G-IN entered from the input terminal 11 is first supplied to the crispening signal-generating circuit 17, which produces the horizontal/vertical edge crispening signal DTL1 in response to the green input signal G-IN. The operation of this crispening signal-generating circuit 17 is exactly the same as the operation of the crispening signal-generating circuit shown in FIGS. 2 and 3.

In the first embodiment of the invention, the crispening signal-generating circuit 17 is composed of a glass delay line or CCD delay line. One example of the coefficient of the multipliers 45 and 55 (FIG. 2) can be ½. One example of the configuration of the crispening signal-generating circuit 17 is shown in FIG. 2. An edge crispening circuit of more complex structure can be constructed by increasing the number of the delay lines such as 35, 39, 43, and 51. In consequence, the direction of edge crispening and frequency components can be controlled with higher accuracy. The horizontal/vertical edge crispening signal DTL1 produced by the crispening signal-generating circuit 17 is supplied to the multiplier 75 shown in FIG. 4.

Referring again to FIG. 4, the green input signal G-IN is entered to the first level detector 59, which detects the level of the green signal G-IN. This first level detector 59 can be readily implemented, for example, with a sample-and-hold circuit. As shown in FIG. 5, the first level detector 59 is composed of a sample-gating circuit 93 and a holding circuit 95. When a sample pulse gates on the sample-gating circuit, the signal is sent to the holding circuit 95 and its amplitude is maintained.

Referring back to FIG. 4, the blue input signal B-IN entered from the input terminal 13 is sent to the second level detector 61 and also to the second delay line 71. This second level detector 61 detects the level of the entered blue signal B-IN and supplies a corresponding signal to the arithmetic circuit 65.

Similarly, the red input signal R-IN entered from the input terminal 15 is supplied to the third level detector 63 and to the third delay line 79. This third level detector 63 detects the level of the entered red input signal R-IN and supplies a corresponding signal to the following arithmetic circuit 67. The arithmetic circuit 65 calculates the coefficient k1 from the levels of the signals G-IN and B-IN detected by the first and second level detectors 59 and 61, respectively.

Similarly, the arithmetic circuit 67 calculates the coefficient k2 from the levels of the signals G-IN and R-IN detected by the first and third level detectors 59 and 63, respectively. These first and second arithmetic circuits 65 and 67 can be implemented, for example, using a division circuit. The coefficients k1 and k2 are calculated according to the following equations:

$$(\text{B-IN level})/(\text{G-IN level}) = k1 \quad (1)$$

$$(\text{R-IN level})/(\text{G-IN level}) = k2 \quad (2)$$

These coefficients k1 and k2 are supplied to the comparator circuit 73. This comparator circuit 73 supplies the greater coefficient to the succeeding decision circuit 77, which in turn compares the coefficient k1 or k2 supplied from the comparator circuit 73 with the reference value a and delivers a coefficient k. The coefficient k is judged on the basis given by the following equation:

If $k1$ or $k2 \geq \alpha, k = k1$ or $k2$, and if $$k1 \text{ or } k2 < \alpha, k = 1 \quad (3)$$

Figure 6:
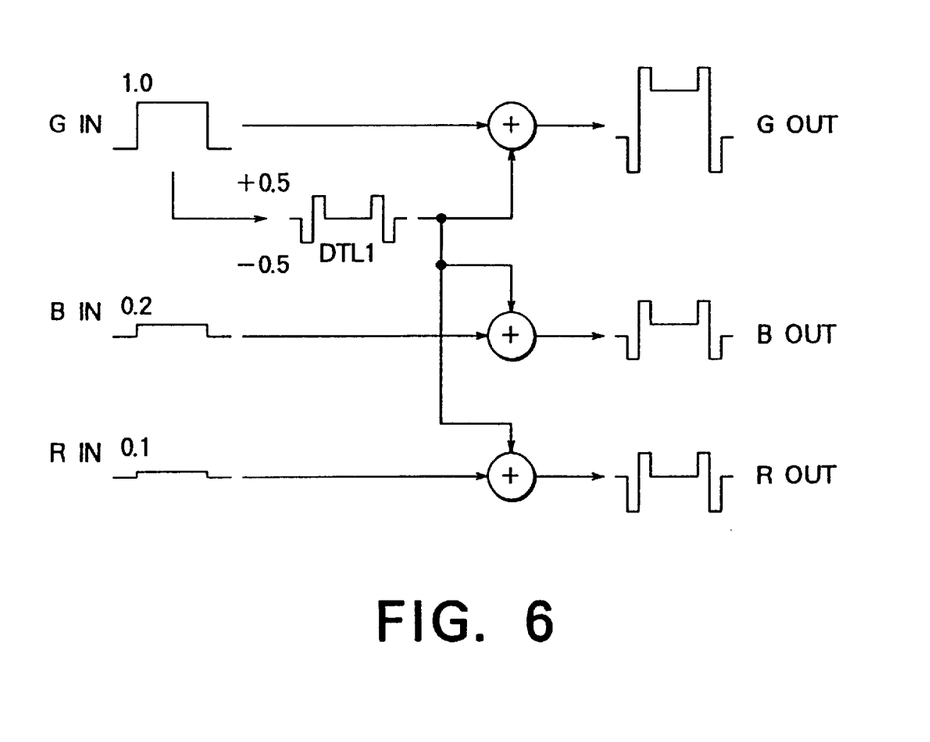
FIG. 6 is a waveform diagram illustrating one example of operation of the edge crispening circuit shown in FIG. 4.
Figure 7:
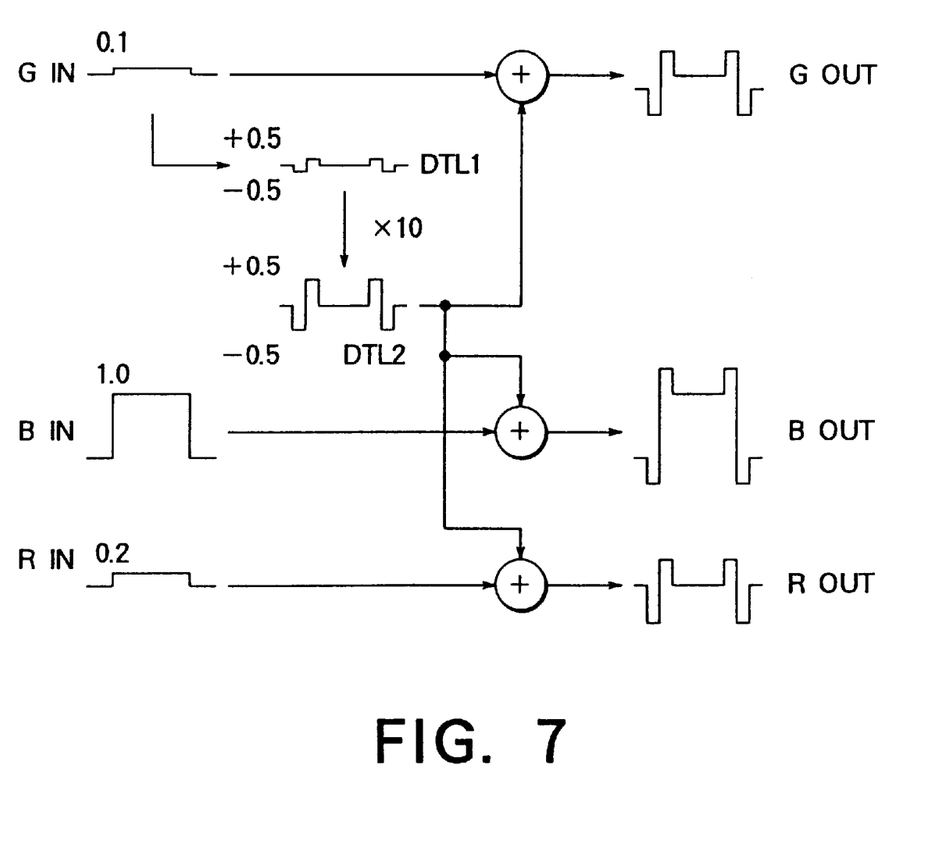
FIG. 7 is a waveform diagram illustrating another example of operation of the edge crispening circuit shown in FIG. 4.

The coefficient k derived according to Eq. (3) above is supplied to the multiplier 75. Various examples of the coefficient k are described below with reference to the accompanying drawings. In FIG. 6, the level of the signal G-IN is 1. The level of the signal B-IN is 0.2. The level of the signal R-IN is 0.1. The reference value α is 1. Suppose that the signals of these levels are applied to the input terminals 11, 13, and 15 shown in FIG. 4. It is considered that the subject has a color approximate to green.Eq. (1) above leads to k1=0.2/1=0.2. Eq. (2) above results in k2=0.1/1=0.1. The coefficients k1 and k2 are supplied to the comparator circuit 73. Since the relation k1>k2 holds, the coefficient supplied to the decision circuit 77 is k1=0.2.The decision circuit 77 judges the reference value α=1 and the coefficient k1=0.2 according to Eq. (3). Since Eq. (3) leads to the relationship ki<α, the coefficient k=1.FIG. 7 shows another example, in which the level of the signal G-IN is 0.1. The level of the signal B-IN is 1. The level of the signal R-IN is 0.2. The reference value α is 1. It is assumed that the signals of these levels are applied to the input terminals 11, 13, and 15 shown in FIG. 4. It is considered that the subject has a color approximate to blue.Eq. (1) above leads to k1=1/0.1=10. Eq. (2) gives the relation k2=0.2/0.1=2. The coefficients k1 and k2 are supplied to the comparator circuit 73. Since the relationship k1>k2 holds, the coefficient supplied to the decision circuit 78 is k1=10.The decision circuit 78 judges the levels of "the reference value α=1" and of the "coefficient k1=10" according to Eq. (3). Since the relation k1≧α holds, the coefficient k=k1=10.The horizontal/vertical edge crispening signal DTL1 produced by the crispening signal-generating circuit 17 is supplied to the multiplier 75, which in turn multiplies the crispening signal DTL1 by the coefficient k to produce the second edge crispening signal DTL2. This signal DTL2 is supplied to the following first adder circuit 83, second adder circuit 87, and third adder circuit 91. The first adder circuit 83 adds the second edge crispening signal DTL2 to the green input signal G-IN whose delay time is made coincident with that of the second edge crispening signal DTL2 by the first delay line 69. An edge-enhanced output signal G-OUT is produced from the output terminal 81. Similarly, the second adder circuit 87 adds the blue input signal B-IN to the second edge crispening signal DTL2, the blue input signal B-IN being made coincident in delay time with the second edge crispening signal DTL2 by the delay line 71. An edge-enhanced output signal B-OUT is produced from the output terminal 85.The third adder circuit 91 adds the red input signal R-IN to the second edge crispening signal DTL2, the red input signal R-IN being made coincident in delay time with the signal DTL2 by the delay line 79. An edge-enhanced output signal R-OUT is delivered from the output terminal 89.The effects of one example of the invention are next described. In this example, the ratio k1 of the level of the blue signal B-IN to the level of the green signal G-IN and the ratio k2 of the level of the red signal R-IN to the level of the green signal G-IN is compared, and the comparison coefficient k is calculated. The level of the horizontal/vertical edge crispening signal DTL1 is varied according to the comparison coefficient k. This crispening signal DTL1 is added to the signals G-IN, B-IN, and R-IN, thus crispening the edges-.More specifically, in the example shown in FIG. 6, the multiplier 75 multiplies the horizontal/vertical edge crispening signal DTL1 by the coefficient k=1, producing the second edge crispening signal DTL2. In this case, DTL2=DTL1*1=DTL1. The edge crispening signal added by the adder circuits 83, 87, and 91 is the same as the horizontal/vertical edge crispening signal DTL1. Where green (G) component prevails on the subject as shown in FIG. 6, the level of the edge crispening signal is not enhanced but added to the R, G, and B signals intact. In FIG. 6, the horizontal/vertical edge crispening signal DTL1 created from the green signal G-IN at level 1 has an amplitude of ±0.5. The output signals G-OUT, B-OUT, and R-OUT are the input signals G-IN, B-IN, and R-IN, respectively, on which the horizontal/vertical edge crispening signal DTL1 having an amplitude of ±0.5 is superimposed.In the instance shown in FIG. 7, the multiplier 75 multiplies the horizontal/vertical edge crispening signal DTL1 by the coefficient k=10, thus producing the second edge crispening signal DTL2. As shown in FIG. 7, the first horizontal/vertical edge crispening signal DTL1 is amplified by a factor of 10 and added to the input signals G-IN, B-IN, and R-IN. In this case, the first horizontal/vertical edge crispening signal DTL1 created from the green signal G-IN at level 0.1 has an amplitude of ±0.05, which is much smaller than the level of the blue signal B-IN. Accordingly, if the edges are crispened by the prior art out-of-green method, the blue signal B-IN that has a large level and thus dominates the color of the subject cannot be subjected to sufficient edge crispening processing. With the edge crispening circuit in accordance with the invention, the level of the edge crispening signal is amplified by a factor of 10 according to the blue signal B-IN. After the level is brought to ±0.5, the edge crispening signal is added to the input signals. Therefore, the blue signal B-IN can undergo sufficient edge crispening processing.When the edge crispening signal created from the G signal is added to the R, G, and B signals, the ratio k1 of the level of the blue signal B-IN to the level of the green signal G-IN and the ratio k2 of the level of the red signal R-IN to the level of the green signal G-IN is compared, and the comparison coefficient k is calculated. The level of the edge crispening signal is varied according to the comparison coefficient k. Therefore, if the subject has only one color, the edge crispening effect is not affected greatly by the color of the subject. Thus, if the level of the green signal G-IN is small compared with the levels of the other signals B-IN and R-IN as encountered when the subject consists of a monochrome image, an edge crispening signal according to the level of the signal B-IN or R-IN can be added. Consequently, good edge crispening effect can be expected.In the embodiment of the invention described above, all colors are divided into three primary colors R, G, and B, and the edge crispening circuit is realized, based on the G signal. Obviously, other primary colors and other reference colors may be adopted.

SECOND EXAMPLE

Figure 8:
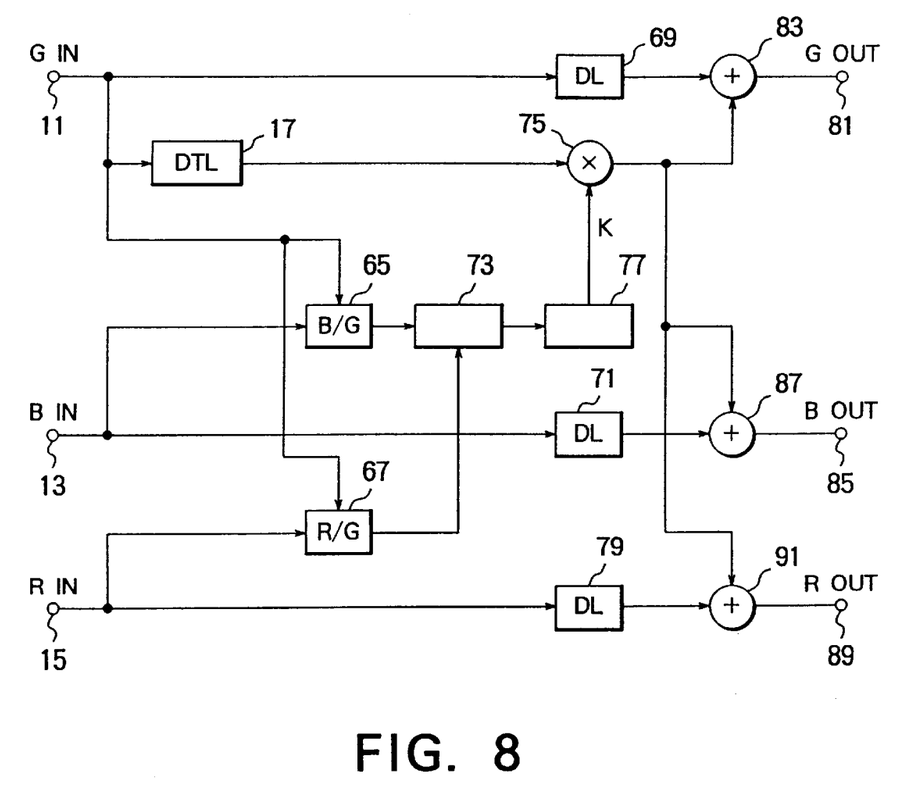
FIG. 8 is a block diagram of another edge crispening circuit in accordance with the invention.

Another edge crispening circuit by the use of digital processing in accordance with the present invention is next described with reference to FIG. 8. This edge crispening circuit is similar to the edge crispening circuit shown in FIG. 4 except that the level detectors have been omitted. Where digital data is applied, it is not necessary to detect the level of each signal, unlike the first example. Rather, the coefficients k1 and k2 may be calculated directly by the arithmetic units 65 and 67, respectively. In the case of digital circuitry, the first delay line 35 and the second delay line 39 of the edge crispening signal-generator circuit shown in FIG. 2 can be implemented with line memories, FIFO (first-in first-out) circuits, or the like. The delay lines 47, 43, and 51 can be realized with shift registers, latch circuits, or the like. Furthermore, the delay lines 69, 71, and 79 shown in FIG. 8 can be implemented with shift registers, latches, or the like. In this embodiment, the first and second level detectors can be omitted, which is an advantage over the first embodiment.

As described thus far, in accordance with the present invention, an edge crispening circuit for a color camera creates an edge crispening signal from green (G) signal. Then, the R, G, and B signals are subjected to edge crispening processing. That is, the out-of-green method is exploited. Therefore, only one edge crispening circuit system suffices. The number of large-scale devices such as delay lines and multipliers can be reduced. Consequently, the size of the edge crispening circuit can be decreased.

Furthermore, in a method in accordance with the invention, the ratio k1 of the level of the blue signal B-IN to the level of the green signal G-IN is calculated. The ratio k2 of the level of the red signal R-IN to the green signal G-IN is computed. The level of the edge crispening signal DTL1 is varied according to these ratios. Where the difference in level between the signals B-IN and G-IN or between the signals R-IN and G-IN is great as encountered where the subject is a monochrome color, the edge crispening device utilizing the out-of-green method can superimpose an edge crispening signal according to the level of the signal B-IN or R-IN. Therefore, good edge crispening effect can be expected.

What is claimed is:

1. An edge crispening circuit comprising:

comparator means and level-varying means, wherein a first arithmetic means for calculating a first ratio of a level of an input blue (B) signal to a level of an input green (G) signal;

a second arithmetic means for calculating a second ratio of a level of an input red (R) signal to the level of the green (G) signal;

a decision means for producing a coefficient, or a weighting factor, used to control a magnitude of an edge crispening signal added to said R, G, and B signals;

means for producing a weighted edge crispening signal by multiplying said edge crispening signal by said coefficient and for adding said weighted edge crispening signal to said R, G, and B signals, respectively, and said first arithmetic means calculates a coefficient k1 from the level of said B signal and from the level of said G signal and produces said coefficient k1;

said second arithmetic means calculates a coefficient k2 from the level of said R signal and from the level of said G signal and produces said coefficient k2;

said comparator means compares the coefficients k1 and k2 in terms of magnitude and selects a greater one;

said decision means compares the coefficient k1 or k2 produced from said comparator means with a reference value α and a produces a coefficient k; and said level-varying means varies the level of the edge crispening signal according to the coefficient k produced from said decision means.

2. The edge crispening circuit of claim 1, further comprising level-detecting means for detecting the levels of said R, G, B signals and supplying corresponding signals to said first and second arithmetic means, wherein said R, G, B signals are analog signals.

3. The edge crispening circuit of claim 2, wherein each of said level-detecting means comprises a sample-gating circuit that is gated on by a sample pulse and a holding circuit for holding the level of a corresponding signal when said sample-gating circuit is gated on.

4. The edge crispening circuit of claim 1, wherein said R, G, B signals are digital signals.

5. A method of performing edge crispening upon an image reproduced from primary color signals (R, G, B), said method comprising the steps of:

producing a correction signal from said G signal;

finding a first ratio of a level of said B signal to a level of said G signal;

finding a second ratio of a level of said R signal to the level of said G signal;

controlling a magnitude of the correction signal according to said first and second reactions;

adding the correction signal to said R, G, B signals, respectively, and further comprising the step of comparing the first and second ratios to produce a comparison output, wherein the magnitude of the edge crispening signal is controlled based on the comparison output.

6. The method of claim 5, wherein the comparison output is a greater one of the first and second ratios.

7. The method of claim 6, further comprising the step of comparing the greater one of the first and second ratios with a reference value to produce a second comparison output, wherein the magnitude of the edge crispening signal is controlled based on the second comparison output.

8. The method of claim 7, wherein the greater one of the first and second ratios is produced as the second comparison output if the greater one of first and second ratios is greater than the reference value.

9. A method of performing edge crispening upon an image reproduced from primary color signals (R, G, B), said method comprising the steps of:

producing a correction signal from said G signal;

finding a first ratio of a level of said B signal to a level of said G signal;

finding a second ratio of a level of said R signal to the level of said G signal;

controlling a magnitude of the correction signal according to said first and second reactions;

adding the correction signal to said R, G, B signals, respectively, and wherein the magnitude of the correction signal is controlled according to the reference value or a larger one of said first and second ratios.

* * * * *